United States Patent
Bae

(10) Patent No.: US 6,950,077 B1
(45) Date of Patent: Sep. 27, 2005

(54) ANTENNA SYSTEM FOR TERRESTRIAL BROADCASTING

(75) Inventor: Bum-youl Bae, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/075,766

(22) Filed: Mar. 10, 2005

(30) Foreign Application Priority Data

Apr. 8, 2004 (KR) .................. 10-2004-0024145

(51) Int. Cl.[7] .............................. H01Q 9/16
(52) U.S. Cl. ................ 343/822; 343/821; 343/795
(58) Field of Search ................ 343/822, 821, 343/820, 823, 793, 795; H01Q 9/16

(56) References Cited

U.S. PATENT DOCUMENTS

| | | | |
|---|---|---|---|
| 5,089,829 A * | 2/1992 | Haruyama et al. | 343/852 |
| 6,097,347 A * | 8/2000 | Duan et al. | 343/802 |
| 6,429,821 B1 | 8/2002 | Lewis, Jr. | 343/749 |
| 6,603,435 B2 | 8/2003 | Lindenmeier et al. | 343/713 |
| 2002/0065539 A1 | 5/2002 | Von Arx et al. | 607/60 |
| 2002/0075145 A1 * | 6/2002 | Hardman et al. | 340/442 |
| 2003/0223519 A1 * | 12/2003 | Jeong et al. | 375/350 |

FOREIGN PATENT DOCUMENTS

| | | | | |
|---|---|---|---|---|
| JP | 2000-232316 | 8/2000 | | H01Q 9/44 |
| KR | 2002-0034815 | 5/2002 | | H01Q 9/16 |

* cited by examiner

Primary Examiner—Hoanganh Le
(74) Attorney, Agent, or Firm—Roylance, Abrams, Berdo & Goodman, L.L.P.

(57) ABSTRACT

Provided is an antenna system for terrestrial broadcasting. The antenna system has a dipole antenna probe receiving a broadcast signal, a signal amplifier amplifying the received broadcast signal, an antenna matching unit matching impedances between the antenna probe and the signal amplifier, an output matching unit matching impedances between an output signal of the signal amplifier and an input terminal of a broadcast receiver to which the output signal is fed, and a bias extractor converting power received from the broadcast receiver into power needed for driving the signal amplifier and supplying the converted power to the signal amplifier.

19 Claims, 5 Drawing Sheets

FIG. 2 (PRIOR ART)

| CHANNEL [VHF] | $f_{1l}$ [MHz] | $f_{1h}$ [MHz] | $f_{cl}$ [MHz] | $f_{visc}$ [MHz] | $f_{ch}$ [MHz] | $f_{2l}$ [MHz] | $f_{2h}$ [MHz] |
|---|---|---|---|---|---|---|---|
| 7 | 174.02 | 174.78 | 175.2 | 175.25 | 175.3 | 175.72 | 176.48 |
| 8 | 180.02 | 180.78 | 181.2 | 181.25 | 181.3 | 181.72 | 182.48 |
| 9 | 186.02 | 186.78 | 187.2 | 187.25 | 187.3 | 187.72 | 188.48 |
| 10 | 192.02 | 192.78 | 193.2 | 193.25 | 193.3 | 193.72 | 194.48 |
| 11 | 198.02 | 198.78 | 199.2 | 199.25 | 199.3 | 199.72 | 200.48 |
| 12 | 204.02 | 204.78 | 205.2 | 205.25 | 205.3 | 205.72 | 206.48 |
| 13 | 210.02 | 210.78 | 211.2 | 211.25 | 211.3 | 211.72 | 212.48 |

ANTENNA SYSTEM FOR TERRESTRIAL BROADCASTING

CROSS-REFERENCE TO RELATED APPLICATION

This application claims priority from Korean Patent Application No. 10-2004-0024145 filed on Apr. 8, 2004 in the Korean Intellectual Property Office, the disclosure of which is incorporated herein by reference in its entirety.

BACKGROUND OF THE INVENTION

1. Field of the Invention

The present invention relates to an antenna system, and more particularly, to an antenna system for terrestrial broadcasting designed to receive a television (TV) broadcast signal and deliver the television (TV) broadcast signal.

2. Description of the Related Art

While a National Television Systems Committee (NTSC) standard is an analog TV broadcast standard used today in North America, an Advanced Television Systems Committee (ATSC) standard is a digital TV broadcast standard. Broadcasts adopting a new technology called data in NTSC video (dNTSC) to embed a digital signal into the existing NTSC TV frequency range are being made over a Very High Frequency-High (VHF-H) band. An indoor or outdoor antenna is needed to receive the VHF-H broadcasts. An indoor antenna is more advantageous than an outdoor antenna in many aspects since the antenna must be connected to a digital set-top box to receive digital broadcasts FIG. 1 is an exemplary diagram showing the spectrum of frequencies within a VHF-H band, over which a dNTSC technique is applied.

Here, double sideband (DSB) modulation is used to mix an analog broadcast signal 100 and a digital broadcast signal 110 into a carrier. While a NTSC format allows a carrier having a frequency $f_{visc}$ to carry the analog broadcast signal 100 having a frequency range of $f_{c1}$ to $f_{ch}$, a dNTSC format is used to additionally carry the digital broadcast signal 110, that is, to transmit a dNTSC data signal outside the frequency range of the analog broadcast signal 100.

FIG. 2 is a table listing frequencies of the respective signals shown in FIG. 1 for VHF channels 7 through 13. The frequency of the carrier ranges from about 170 to about 220 megahertz (MHz) on the channels 7 through 13. Regardless of the channel, the analog broadcast signal 100 has a bandwidth of 0.1 MHz while the dNTSC 110 has a bandwidth of 0.76 MHz.

However, an indoor antenna for receiving a VHF-H signal including a digital broadcast signal is subject to space restrictions. Due to the space restrictions, it is difficult to determine the size of an antenna that varies according to a frequency band and realizes a dipole antenna. Thus, it is highly desirable to have an indoor antenna having a desired electrical length while occupying a small space to enable users to watch television broadcasts on Ultra High Frequency (UHF) band as well as VHF-H band.

Furthermore, a broadcast signal needs to be amplified in an antenna to improve its signal to noise ratio (SNR), since a higher SNR is achieved when the signal is amplified in the antenna before being sent to the next stage. In the case of a dipole antenna, the antenna must be designed to solve problems arising between a balance circuit and an unbalance circuit for signal amplification.

SUMMARY OF THE INVENTION

The present invention provides an antenna system designed to maximize signal propagation by compensating for an electrical length of an antenna probe by adding an inductor to the antenna probe and achieving wideband impedance matching between the antenna probe and a signal amplifier.

The above stated object as well as other objects of the present invention will become clear to one skilled in the art upon review of the following description, the attached drawings and appended claims.

According to an aspect of the present invention, there is provided an antenna system for terrestrial broadcasting comprising a dipole antenna probe receiving a broadcast signal, a signal amplifier amplifying the received broadcast signal, an antenna matching unit matching impedances between the antenna probe and the signal amplifier, an output matching unit matching impedances between an output signal of the signal amplifier and an input terminal of a broadcast receiver to which the output signal is fed, and a bias extractor converting power received from the broadcast receiver into power required for driving the signal amplifier and supplying the converted power to the signal amplifier.

The broadcast signal may comprise data in a National Television Systems Committee (NTSC) video (dNTSC) broadcast signal transmitted over a Very High Frequency-High (VHF-H) band.

In addition, the dipole antenna probe may comprise a probe with a variable length.

Further, the signal amplifier may comprise a monolithic microwave integrated circuit (MMIC) reducing noise contained in the received broadcast signal and amplifying the received broadcast signal.

Also, the antenna matching unit may comprise a coil structure connected in series with a negative-probe of the antenna probe.

Further, the antenna matching unit may comprise a balun circuit. In this case, the balun circuit preferably comprises a ferrite core.

In addition, the output matching unit may comprise a capacitor element.

The bias extractor may comprise a plurality of passive circuit elements.

In another preferred embodiment of the present invention, the antenna system may further comprise a circuit protector for maintaining the power supplied from the broadcast receiver substantially constant and preventing electrostatic discharge. In this case, the circuit protector may comprise an arrestor.

BRIEF DESCRIPTION OF THE DRAWINGS

The above and other features and advantages of the present invention will become more apparent from the following description of exemplary embodiments thereof with reference to the attached drawings in which:

FIG. 2 is a table listing frequencies of the respective signals shown in FIG. 1;

DETAILED DESCRIPTION OF THE PREFERRED EMBODIMENTS

Figure 1:
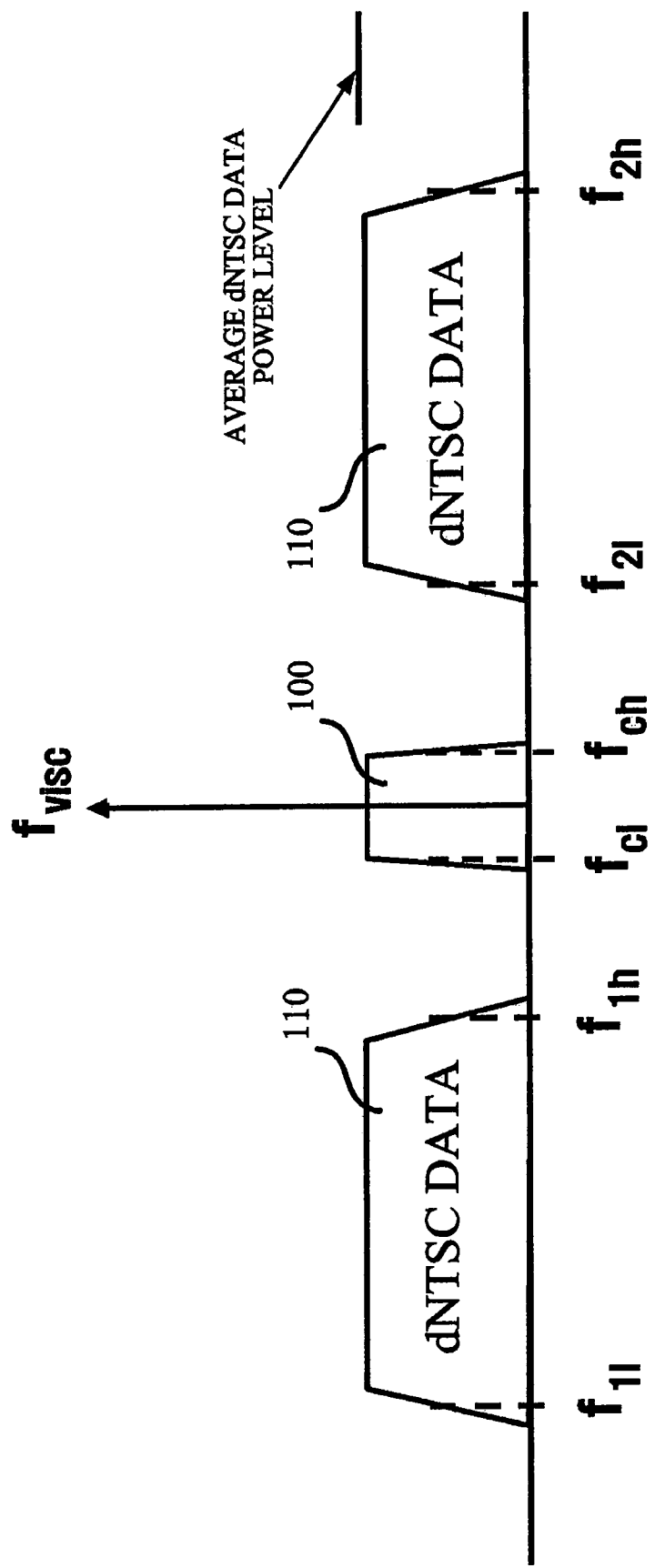
FIG. 1 is an exemplary diagram showing the spectrum of frequencies within a VHF-H band over which a dNTSC technique is applied.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Like reference numerals refer to like elements throughout the specification.

Figure 3:
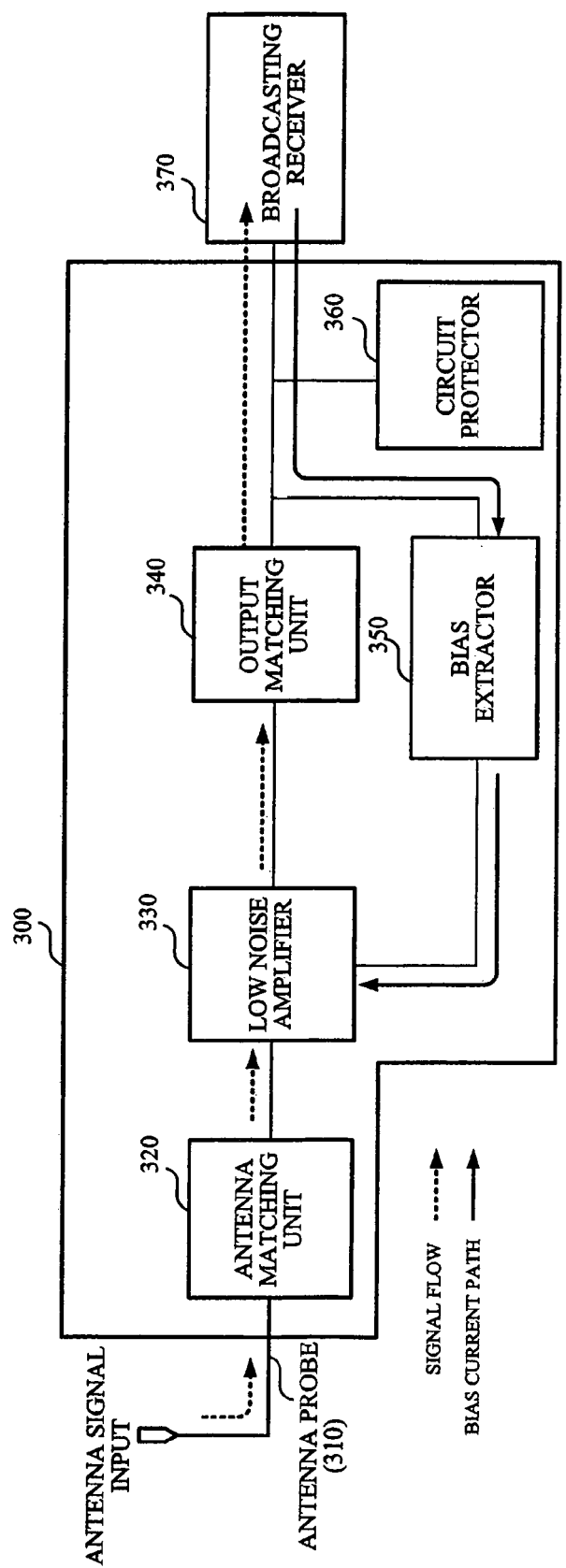
FIG. 3 is a block diagram of an antenna system according to an embodiment of the present invention.

FIG. 3 is a block diagram of an antenna system according to an embodiment of the present invention. Referring to FIG. 3, the antenna system 300 according to an embodiment of the present invention comprises an antenna probe 310 that receives a broadcast signal, an antenna matching unit 320 that performs impedance matching between the antenna probe 310 and a low noise amplifier 330, the low noise amplifier 330 that amplifies the broadcast signal in such a manner as to minimize noise contained in the broadcast signal and maximize gain over frequency band of the broadcast signal, an output matching unit 340 that performs impedance matching between the low noise amplifier 330 and an input terminal of a broadcast receiver (e.g., set-top box) 370 before a signal outputted at the low noise amplifier 330 is sent to the input terminal of the broadcast receiver 370, and a bias extractor 350 that receives power from the input terminal of the broadcast receiver 370 and then supplies a predetermined level of power to the low noise amplifier 330.

In this case, the antenna system 300 may further comprise a circuit protector 360 that protects circuit elements making up the antenna system 300.

The frequency band of the broadcast signal may include a Very High Frequency (VHF) band ranging from 30 to 300 megahertz (MHz) or an Ultra High Frequency (UHF) band ranging from 300 MHz to 3 gigahertz (GHz). Furthermore, the antenna probe 310 may be a dipole antenna. To aid in the understanding of the present invention, in the dipole antenna, a probe connected to ground and a probe not connected to ground are referred to as a 'negative-probe' and a 'positive-probe', respectively.

Now, functions and operations of the above-stated elements will be described in detail.

To properly deliver a broadcast signal received through the antenna probe 310 to the low noise amplifier 330, impedance matching is performed by the antenna matching unit 320 located between the antenna probe 310 and the low noise amplifier 330. To facilitate impedance matching, a reactance component on the antenna probe 310 can be removed by modifying the structure of the antenna probe 310. For a typical dipole antenna, a reactance component on the antenna probe 310 varies with a dipole length. Thus, when the length of the antenna probe 310 in the dipole antenna is reduced due to space restrictions, it is desirable to change the structure of the antenna probe in a manner that institutes a desired change in the amount of reactance component, as well. To change the structure of the antenna probe 310, one side of either the positive-probe or the negative-probe may be in the form of a coil (hereinafter referred to as a "loading coil"), which reduces capacitance of the antenna probe 310 and a voltage standing wave ratio (VSWR) of the dipole antenna.

The antenna matching unit 320 uses the loading coil to match the impedance of the antenna probe 310 to the input impedance of the low noise amplifier 330 over the VHF or UHF band, thereby transmitting potential difference applied to the antenna probe 310 to the low noise amplifier 330 as much as possible while providing wideband impedance matching for reception over a wide range of frequencies.

Furthermore, the antenna matching unit 320 includes a circuit used to couple a balance circuit of the dipole antenna to an unbalance circuit of a coaxial line, thereby preventing changes in radiation pattern and reception characteristics of the antenna due to unwanted surface current flowing in a coaxial line when coupling the balance circuit to the unbalance circuit.

Upon receipt of the broadcast signal from the antenna matching unit 320, the low noise amplifier 330 amplifies the same signal in such a manner as to maximize gain and minimize the noise temperature over a frequency band of the broadcast signal. In this way, the broadcast signal is amplified within the antenna system 300 before being sent to the broadcast receiver 370, thus minimizing distortion of the broadcast signal.

The output matching unit 340 matches output impedance of the low noise amplifier 330 to tuner impedance of the broadcast receiver 370.

After the broadcast signal received from the antenna probe 310 passes through the antenna matching unit 320 and is amplified by the low noise amplifier 330, the amplified signal then passes through the output matching unit 340 to a tuner of the broadcast receiver 370. The bias extractor 350 converts power from the broadcast receiver 370 into a level of power required for driving the low noise amplifier 330.

The antenna system 300 may further comprise the circuit protector 360 that protects the circuit elements forming the antenna system 300 against spike noise resulting from static electricity or ground potential difference. While FIG. 3 shows that the circuit protector 360 is located at a position that enables the reception of power from the broadcast receiver 370, the circuit protector 360 may be located at another position. For example, a separate circuit protector may also be positioned between the antenna matching unit 320 and the low noise amplifier 330 so as to protect the low noise amplifier 330.

Furthermore, the broadcast signal or power may be transmitted between the antenna system 300 and the broadcast receiver 370 via a single cable.

Figure 4:
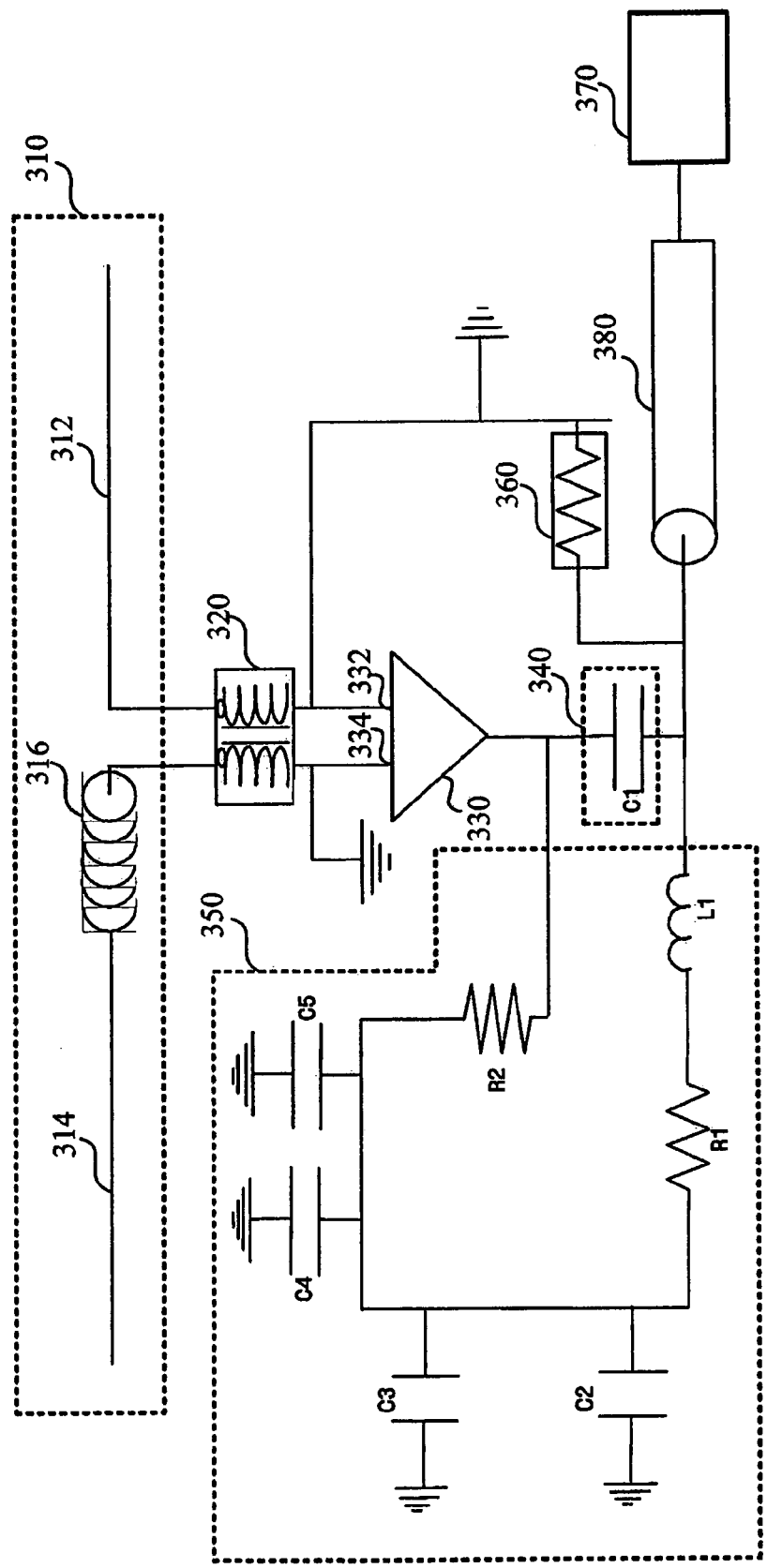
FIG. 4 is a circuit diagram of an antenna system according to an embodiment of the present invention.

FIG. 4 is a circuit diagram of an antenna system according to an embodiment of the present invention.

An antenna probe 310 is a dipole antenna probe consisting of a positive-probe 312 and a negative-probe 314. In this case, a loading coil 316 described as above may be connected to either an input terminal 332 or a ground terminal 334 of a low noise amplifier 330. In the illustrative embodiment, the loading coil 316 may be connected to the ground terminal 334. Furthermore, the lengths of the positive-probe 312 and the negative-probe 314 may be adjusted to improve the reception sensitivity of a broadcast signal. Meanwhile, for example, when an input impedance $Z_{in}$ of the dipole antenna is expressed as 20-j314, the final input impedance $Z_{in}$ of 20 is obtained by creating +j314 component, which can be achieved by connecting the loading coil 316 in series to the negative-probe 314. In this case, reactance $X = jwL = j(2\pi f)$ where j is an imaginary operator, w is the angular frequency, and L is the inductance of the loading coil 316. To provide impedance-matching characteristics over a VHF-H band ranging from 174 to 216 MHz, 314 = $2*3.14*200*10^6*L$ when frequency f is 200 MHz. Solving the equation results in the inductance L of 250 nH. In this case, the loading coil 316 has the number of turns of 10, a thickness of 1.1 mm, and an inside diameter of 5.2 mm.

Figure 5:
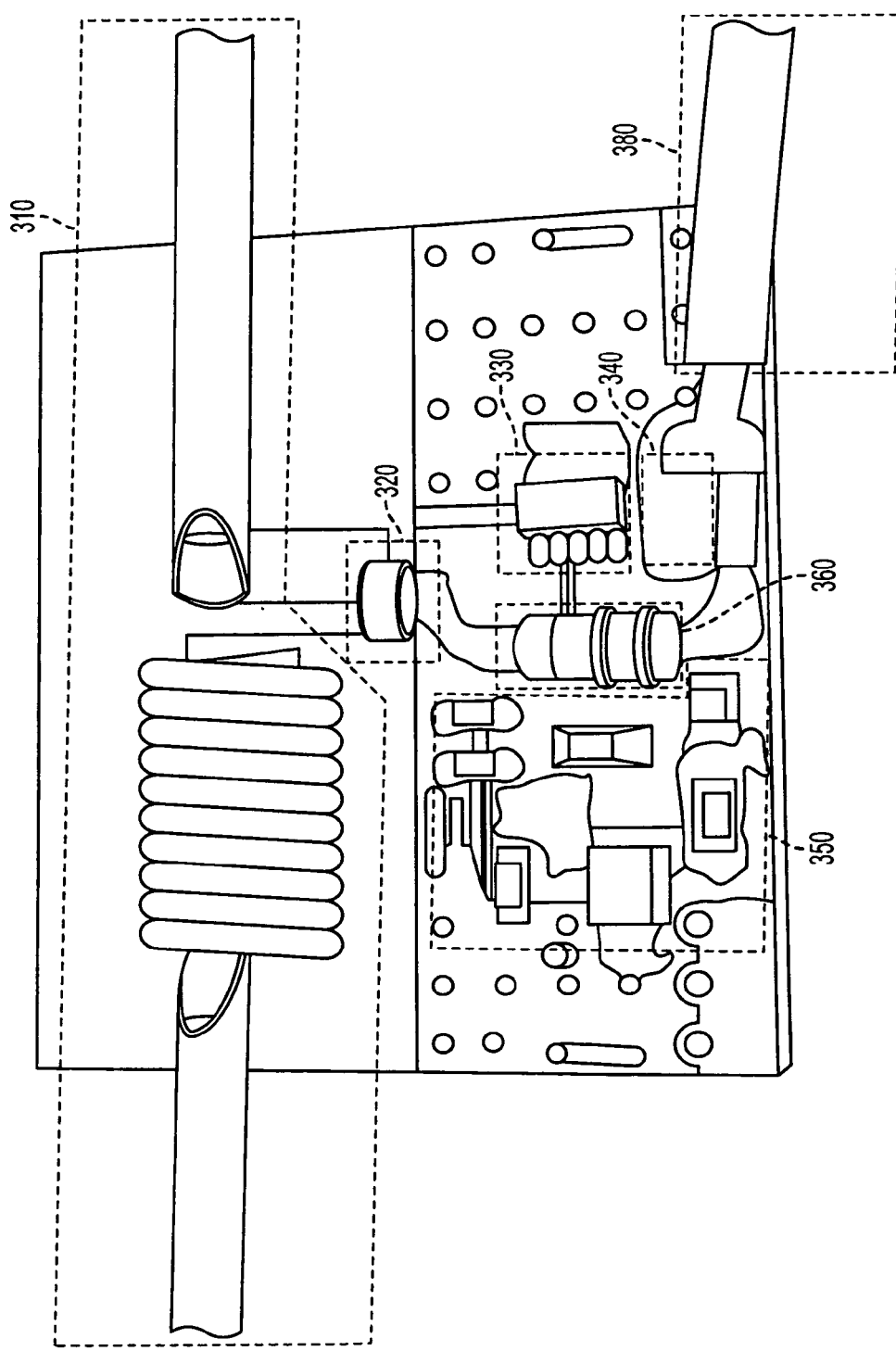
FIG. 5 illustrates an antenna system constructed according to an embodiment of the present invention.

By doing so, an input impedance of the dipole antenna eventually becomes 20. Meanwhile, when the input impedance of the low noise amplifier 330 is 50 Ω, an impedance-matching transformer with a 1:2.5 turns ratio is used to match the 50 Ωfor the mutual impedance matching. Furthermore, a separate circuit is preferably used to solve problems caused by coupling a balance circuit of a dipole antenna with an unbalance circuit of a coax line. In the illustrative embodiment, a balun circuit in the antenna matching unit 320 is used to enable the balance circuit to be coupled to the unbalance circuit or vice versa. When the balun circuit is realized using transmission lines, the circuit is usually bulky in size and has a narrow bandwidth. Thus, to reduce the size and widen the bandwidth, the balun circuit may be realized using a ferrite core as shown in FIG. 5. Meanwhile, the balun circuit may be connected to either input or output terminal of the low noise amplifier 330, preferably, to the input terminal of the low noise amplifier 330, so as to solve an imbalance between the balance circuit of the antenna probe 310 and the unbalance circuit of the coax line.

A predetermined quality of power must be supplied to the low noise amplifier 330 to amplify the broadcast signal fed through the antenna probe 310. In the illustrative embodiment, Gali-52LNA Monolithic Microwave IC (MMIC) is used as the low noise amplifier 330 (hereinafter called "Gali-52LNA") available from Mini-Circuits.

When the Gali-52LNA requires operating voltage of 4.4 V and current of 50 mA, the bias extractor 350 makes the magnitudes of power and current supplied by the broadcast receiver 370 to be equal to 4.4 V and 50 mA. In this case, the broadcast receiver 370 is a set-top box and a voltage supplied from the set-top box is 12 V direct current (DC).

Here, the bias extractor 350 is comprised of a resistor, a capacitor, and an inductor.

Since the Gali-52LNA requires operating voltage of 4.4 V and current of 50 mA, $(12-4.4)=0.05*x$ where x is resistance. Solving the equation results in resistance x of 152 Ω. Thus, since power is 38 mW ($0.05*0.05*152$), two 75 Ω. ¼ watt resistors R1 and R2 are connected in series.

Inductor L1 used for bias extraction must have an impedance greater than 50 Ω, and preferably greater than 500 Ω. When a frequency is 200 MHz and $jx=jwL$, $2*3.14*2\times10^8*L>500$. A solution to this inequality is $L>398nH$. Actually, the inductor L1 exhibits the same characteristics when the range of inductance is from 350 nH to 3 uH. For a chip inductor, it is preferably designed to provide for inductance of less than 3 uH and resist current of 100 mA. In the illustrative embodiment, a 2.7 uH chip inductor that is easy to mount is used.

Shunt chip capacitors C3, C4 and C5 act to block radio waves that travel through a bias circuit and is reflected toward the low noise amplifier 330. In the present embodiment, the capacitors C3, C4, and C5 have capacitances of 1,000 pF, 100 pF, and 10 nF, respectively. The capacitor C2 is used to remove an instantaneous pulse occurring when a coaxial cable 380 shown in FIG. 4 is connected to the broadcast receiver 370. Since it is desirable to use a capacitor having a large capacitance, a 10-uF tantal capacitor is used in the illustrative embodiment. Referring to FIG. 4, an output matching unit 340 used to properly transfer the broadcast signal amplified by the low noise amplifier 330 is realized using the DC blocking capacitor C1 that prevents the transfer of DC signals. The capacitance of the capacitor C1 is set such that its impedance X is much less than 50 Ω, preferably, less than 5 Ωover an available frequency range. When $X=1/(jwC1)$ and frequency in hertz is 200 MHz, $5>|1/(2*pi*2\times10^8*C1)|$. The solution of this inequality is $C1>169$ pF. However, since with increasing frequency, the capacitor C1 becomes self-resonant and cannot maintain its own characteristics, it is desirable to use a very small capacitor having a high self-resonant point or a capacitor having a slightly lower capacitance. In the illustrative embodiment, the capacitor C1 has capacitance of 100 pF since its insertion loss is less than 0.3 dB over the available frequency range.

Meanwhile, a circuit protector 360 protects the low noise amplifier 330 by eliminating electrostatic discharge originating from the inner wire of the coaxial cable 380 or the positive-probe 312. In the illustrative embodiment, the circuit protector 360 is constructed using an arrestor. There are three types of arrestors available, that is, variable resistor type, capacitor type, and discharge type. Since variable resistor type and capacitor type arrestors attached to a circuit change electrical characteristics, it is desirable to use a discharge type arrestor as shown in the illustrative embodiment.

FIG. 5 shows an antenna system in which the circuits shown in FIG. 4 are placed on a printed circuit board (PCB) according to an embodiment of the present invention. The coaxial cable 380 receives power from the broadcast receiver 370 through its end (not shown) connected to the broadcast receiver 370 for supply to the low noise amplifier 330 and transmits a broadcast signal amplified by the low noise amplifier 330 to the broadcast receiver 370.

An antenna system of the present invention is designed with a reduced length of a dipole antenna suitable for indoor use and to amplify a broadcast signal fed through an antenna probe before sending it to a broadcast receiver such as a set-top box, thereby minimizing distortion in the broadcast signal. In concluding the detailed description, those skilled in the art will appreciate that many variations and modifications can be made to the preferred embodiments without substantially departing from the principles of the present invention. Therefore, the disclosed preferred embodiments of the invention are used for illustrative purposes and not for purposes of limitation.

What is claimed is:

1. An antenna system for terrestrial broadcasting comprising:
    a dipole antenna probe for receiving a broadcast signal;
    a signal amplifier for amplifying the received broadcast signal;
    an antenna matching unit for matching impedances between the antenna probe and the signal amplifier;
    an output matching unit for matching impedances between an output signal of the signal amplifier and an input terminal of a broadcast receiver to which the output signal is fed; and
    a bias extractor for converting power received from the broadcast receiver into power required for driving the signal amplifier and supplying the converted power to the signal amplifier.

2. The antenna system of claim 1, wherein the broadcast signal comprises data in a National Television Systems Committee (NTSC) video (dNTSC) broadcast signal transmitted over a Very High Frequency-High (VHF-H) band.

3. The antenna system of claim 1, wherein the dipole antenna probe comprises a probe with a variable length.

4. The antenna system of claim 1, wherein the signal amplifier comprises a monolithic microwave integrated circuit (MMIC) for reducing noise contained in the received broadcast signal and amplifying the received broadcast signal.

5. The antenna system of claim 1, wherein the antenna matching unit comprises a coil structure connected in series with a negative-probe of the antenna probe.

6. The antenna system of claim 1, wherein the antenna matching unit comprises a balun circuit.

7. The antenna system of claim 6, wherein the balun circuit comprises a ferrite core.

8. The antenna system of claim 1, wherein the output matching unit comprises a capacitor element.

9. The antenna system of claim 1, wherein the bias extractor comprises a plurality of passive circuit elements.

10. The antenna system of claim 1, further comprising a circuit protector for maintaining the power supplied from the broadcast receiver substantially constant and preventing electrostatic discharge.

11. The antenna system of claim 10, wherein the circuit protector comprises an arrestor.

12. A method of maximizing signal propagation in an antenna system comprising the steps of:
providing a loading coil to an antenna probe;
matching impedances between the antenna probe and a signal amplifier;
matching impedances between an output signal of the signal amplifier and an input terminal of a broadcast receiver to which the output signal is fed;
converting power received from the broadcast receiver into power required for driving the signal amplifier; and
supplying the converted power to the signal amplifier.

13. The method of claim 12, wherein a broadcast signal provided to the antenna probe is a National Television Systems Committee (NTSC) video (dNTSC) broadcast signal transmitted over a Very High Frequency-High (VHF-H) band.

14. The method of claim 12, wherein the antenna probe has a variable length.

15. The method of claim 12, further comprising the step of operating a monolithic microwave integrated circuit (MMIC) in the signal amplifier to reduce noise contained in the received broadcast signal and amplify the received broadcast signal.

16. The method of claim 12, wherein the providing step comprises the step of connecting a coil structure in series with a negative-probe of the antenna probe.

17. The method of claim 12, wherein the step of matching impedances between the antenna probe and a signal amplifier is performed via a balun circuit.

18. The method of claim 12, wherein the step of converting power is performed via a bias extractor comprising a plurality of passive circuit elements.

19. The method of claim 12, further comprising the step of operating a circuit protector to maintain the power supplied from the broadcast receiver substantially constant and to prevent electrostatic discharge.

* * * * *